(12) United States Patent
Jung et al.

(10) Patent No.: US 8,283,220 B2
(45) Date of Patent: Oct. 9, 2012

(54) LIQUID CRYSTAL DISPLAY DEVICE AND FABRICATION METHOD THEREOF

(75) Inventors: Ji-Hyun Jung, Gyeongsangbuk-do (KR); Dong-Young Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/053,047

(22) Filed: Mar. 21, 2011

(65) Prior Publication Data
US 2011/0171793 A1 Jul. 14, 2011

Related U.S. Application Data

(62) Division of application No. 11/819,122, filed on Jun. 25, 2007, now Pat. No. 7,911,551.

(30) Foreign Application Priority Data

Dec. 26, 2006 (KR) .......................... 10-2006-0134203

(51) Int. Cl.
*H01L 21/00* (2006.01)
(52) U.S. Cl. ............................. 438/158; 257/E21.409
(58) Field of Classification Search .............. 438/129, 438/158; 257/E21.409
See application file for complete search history.

(56) References Cited

U.S. PATENT DOCUMENTS

| 5,835,177 | A | 11/1998 | Dohjo et al. |
| 7,023,508 | B2 | 4/2006 | You |
| 7,348,198 | B2 | 3/2008 | Ahn |
| 2002/0135709 | A1 | 9/2002 | Sung Chae et al. |
| 2002/0158994 | A1 | 10/2002 | Hashimoto et al. |
| 2004/0114060 | A1* | 6/2004 | Kim et al. ................... 349/44 |
| 2005/0142681 | A1 | 6/2005 | Soh |
| 2005/0248708 | A1* | 11/2005 | Park et al. ................. 349/149 |
| 2006/0139552 | A1* | 6/2006 | Ahn ............................ 349/149 |
| 2006/0145157 | A1 | 7/2006 | Choi et al. |
| 2006/0243980 | A1* | 11/2006 | Lee et al. .................... 257/72 |
| 2008/0030671 | A1 | 2/2008 | You |
| 2008/0094534 | A1 | 4/2008 | Jung et al. |
| 2008/0129943 | A1 | 6/2008 | Cho et al. |
| 2008/0131818 | A1 | 6/2008 | Ha et al. |
| 2008/0143903 | A1 | 6/2008 | Ahn |

FOREIGN PATENT DOCUMENTS

GB  2403058 A  12/2004

(Continued)

*Primary Examiner* — William D Coleman
*Assistant Examiner* — Christine Enad
(74) *Attorney, Agent, or Firm* — Morgan, Lewis & Bockius LLP

(57) ABSTRACT

A method for fabricating a display includes providing a first substrate divided into a pixel part and first and second pad parts, forming a gate electrode and a gate line in the pixel part of the first substrate and forming a gate pad line in the first pad part of the first substrate, forming a first insulation film and a semiconductor film over the gate electrode, the gate line and the gate pad line, forming an active pattern over the gate electrode from the semiconductor film with the first insulation film interposed therebetween and forming a contact hole exposing a portion of the gate pad line using a single mask, forming source and drain electrodes in the pixel part, forming a pixel electrode in the pixel part, forming a gate pad electrode electrically connected with the gate pad line via the contact hole, forming a second insulation film over the pixel electrode and the gate pad electrode, exposing a portion of the pixel electrode and at least one portion of the gate pad electrode, and attaching the first substrate and a second substrate.

13 Claims, 17 Drawing Sheets

FOREIGN PATENT DOCUMENTS

| | | |
|---|---|---|
| KR | 10-2000-0010168 | 2/2000 |
| KR | 10-2002-0092722 | 12/2002 |
| KR | 10-2003-0075921 | 9/2003 |
| KR | 10-2005-0068847 | 7/2005 |

* cited by examiner

LIQUID CRYSTAL DISPLAY DEVICE AND FABRICATION METHOD THEREOF

This invention is a divisional patent application of patent application Ser. No. 11/819,122, filed on Jun. 25, 2007 now U.S. Pat. No. 7,911,551, which claims the benefit of Korean Patent Application No. 10-2006-134203 filed in Korea on Dec. 26, 2006, which is hereby incorporated by reference in its entirety.

BACKGROUND OF THE INVENTION

1. Field of the Invention

Embodiments of the present invention relate to a display device and, more particularly, to an liquid crystal display device (LCD) and a fabrication method thereof. Although embodiments of the invention are suitable for a wide scope of applications, it is particularly suitable for simplifying a fabrication process and preventing generation of wavy noise by reducing the number of masks.

2. Description of the Related Art

As the consumer's interest in information displays is growing and the demand for portable (mobile) information devices is increasing, research and commercialization of light and thin flat panel displays ("FPD") has increased. Among FPDs, the liquid crystal display ("LCD") is a device for displaying images by using optical anisotropy of liquid crystal. LCD devices exhibit excellent resolution and color and picture quality, so it is widely used for notebook computers or desktop monitors, and the like. The LCD includes a color filter substrate, an array substrate and a liquid crystal layer formed between the color filter substrate and the array substrate. An active matrix (AM) driving method commonly used for the LCD is a method in which liquid crystal molecules in a pixel part are driven by using amorphous silicon thin film transistors (a-Si TFTs) as switching elements. In the fabricating process of the LCD, a plurality of masking processes (namely, photolithography processes) are performed to fabricate the array substrate including the TFTs, so a method for reducing the number of masking process will increase productivity.

FIG. 1 is an exploded perspective view showing the related art LCD. As shown in FIG. 1, the LCD includes a color filter substrate 5, an array substrate 10 and a liquid crystal layer 30 formed between the color filter substrate 5 and the array substrate 10. The color filter substrate 5 includes a color filter (C) including a plurality of sub-color filters 7 that implement red, green and blue colors, a black matrix 6 for dividing the sub-color filters 7 and blocking light transmission through the liquid crystal layer 30, and a transparent common electrode 8 for applying electric field to the liquid crystal layer 30. The array substrate 10 includes gate lines 16 and data lines 17 which are arranged vertically and horizontally to define a plurality of pixel regions (P), TFTs, switching elements, formed at respective crossings of the gate lines 16 and the data lines 17, and pixel electrodes 18 formed on the pixel regions (P). The color filter substrate 5 and the array substrate 10 are attached in a facing manner by a sealant (not shown) formed at an edge of an image display region to form a liquid crystal panel, and the attachment of the color filter substrates 5 and the array substrate 10 is made by an attachment key (not shown) formed on the color filter substrate 5 or the array substrate 10.

FIGS. 2A to 2E are cross-sectional views sequentially showing a fabrication process of the array substrate of the LCD in FIG. 1. As shown in FIG. 2A, a gate electrode 21 made of a conductive material is formed by using a photolithography process (a first masking process) on a substrate.

Next, as shown in 2B, a first insulation film 15a, an amorphous silicon thin film and an n+ amorphous silicon thin film are sequentially deposited on the entire surface of the substrate 10 with the gate electrode 21 formed thereon, and the amorphous silicon thin film and the n+ amorphous silicon thin film are selectively patterned by using a photolithography process (a second masking process) to form an active pattern 24 formed of the amorphous silicon thin film on the gate electrode 21. In this case, the n+ amorphous silicon thin film pattern 25, which has been patterned in the same form as the active pattern 24, is formed on the active pattern 24.

Thereafter, as shown in FIG. 2C, a conductive metal material is deposited over the entire surface of the array substrate 10 and then selectively patterned by using a photolithography process (a third masking process) to form a source electrode 22 and a drain electrode 23 at an upper portion of the active pattern 24. At this time, a certain portion of the n+ amorphous silicon thin film pattern formed on the active pattern 24 is removed through the third masking process to form an ohmic-contact layer 25' between the active pattern 24 and the source and drain electrodes 22 and 23.

Subsequently, as shown in FIG. 2D, a second insulation film 15b is deposited on the entire surface of the array substrate 10 with the source electrode 22 and the drain electrode 23 formed thereon, and a portion of the second insulation film 15b is removed through a photolithography process (a fourth masking process) to form a contact hole 40 exposing a portion of the drain electrode 23.

As shown in FIG. 2E, a transparent conductive metal material is deposited on the entire surface of the array substrate 10 and then selectively patterned by using a photolithography process (a fifth making process) to form a pixel electrode 18 electrically connected with the drain electrode 23 via the contact hole 40.

As mentioned above, in fabricating the array substrate including TFTs according to the related art, a total of five photolithography processes are necessarily performed to pattern the gate electrode, the active pattern, the source and drain electrodes, the contact hole and the pixel electrode. A photolithography process is a process of transferring a pattern formed on a mask onto the substrate on which a thin film is deposited to form a desired pattern, which includes a plurality of processes such as a process of coating a photosensitive solution, an exposing process and a developing process, etc. In particular, because the masks designed for forming the pattern are quite expensive, as the number of masks used in the processes increases, the fabrication cost of the LCD increases proportionally.

A technique for fabricating the array substrate by performing the masking process four times by forming the active pattern and the source and drain electrodes using a single masking process having a diffraction (slit) mask has been proposed. However, because the active pattern, the source and drain electrodes and the data lines are simultaneously patterned by performing an etching process twice, the active pattern protrusively remains near the lower portions of the source electrode, the drain electrode and the data lines. The protrusively remaining active pattern is formed of an intrinsic amorphous silicon thin film, so the protrusively remaining active pattern is exposed to light from the lower backlight, generating an optical current. The amorphous silicon thin film reacts slightly to a blinking of the light from the back light, and repeatedly becomes activated and deactivated, which causes a change in the optical current. The changing optical current component is coupled with a signal flowing in the neighboring pixel electrodes so as to distort movement of the liquid crystal molecules positioned at the pixel electrodes. As a result, a wavy noise is generated such that a wavy fine line appears on a screen of the LCD. In addition, because the active pattern positioned at the lower portion of the data lines has portions that protrude at a certain height from both sides of the data lines, the opening region of the pixel part is encroached by as much as the protrusion height, thus resulting in a reduction in an aperture ratio of the LCD.

SUMMARY OF THE INVENTION

Accordingly, embodiments of the invention are directed to a liquid crystal display (LCD) and its fabrication method that substantially obviates one or more of the problems due to limitations and disadvantages of the related art.

An object of embodiments of the invention is to provide a liquid crystal display (LCD) and its fabrication method capable of fabricating an array substrate by performing a masking process four times.

Another object of embodiments of the invention is to provide an LCD and its fabrication method capable of implementing high picture quality without generating a wavy noise.

Still another object of embodiments of the invention is to provide an LCD and its fabrication method capable of implementing high luminance.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method for fabricating a display includes providing a first substrate divided into a pixel part and first and second pad parts, forming a gate electrode and a gate line in the pixel part of the first substrate and forming a gate pad line in the first pad part of the first substrate, forming a first insulation film and a semiconductor film over the gate electrode, the gate line and the gate pad line, forming an active pattern over the gate electrode from the semiconductor film with the first insulation film interposed therebetween and forming a contact hole exposing a portion of the gate pad line using a single mask, forming source and drain electrodes in the pixel part, forming a pixel electrode in the pixel part, forming a gate pad electrode electrically connected with the gate pad line via the contact hole, forming a second insulation film over the pixel electrode and the gate pad electrode, exposing a portion of the pixel electrode and at least one portion of the gate pad electrode, and attaching the first substrate and a second substrate.

In another aspect, a display device includes a first array substrate divided into a pixel part and first and second pad parts, a gate electrode and a gate line in the pixel part of the first substrate and a gate pad line in the first pad part of the first substrate, a first insulation film over the gate electrode, the gate line and the gate pad line, an active pattern over the gate electrode with the first insulation film interposed therebetween, a contact hole in the first insulation film exposing a portion of the gate pad line, source and drain electrodes over the active pattern, a pixel electrode connected to the drain electrode, a gate pad electrode and a gate pad electrode pattern electrically connected with the gate pad line via the contact hole, a second insulation film over the pixel electrode pattern and the gate pad electrode pattern, a portion of the pixel electrode exposed through the pixel electrode pattern and the second insulation film, at least one portion of the gate pad electrode exposed through the gate pad electrode pattern and the second insulation film, and a second array substrate attached to the first array substrate.

In yet another aspect, a display device includes a first substrate divided into a pixel part and first and second pad parts, a gate electrode and a gate line in the pixel part of the first substrate and a gate pad line in the first pad part of the first substrate, an active pattern over an upper portion of the gate electrode with a first insulation film interposed therebetween, an ohmic-contact layer and a barrier metal layer over source and drain regions of the active pattern, source and drain electrodes in the pixel part of the first substrate and electrically connected with the source and drain regions of the active pattern via the ohmic-contact layer and the barrier metal layer, a data line in the pixel part of the first substrate and crossing the gate line to define pixel regions, a pixel electrode electrically connected with the drain electrode, a contact hole exposing a portion of the gate pad line, a gate pad electrode electrically connected with the gate pad line via the contact hole, a second insulation film over the first substrate and exposing the pixel electrode of the pixel region, and a second substrate attached with the first substrate in a facing manner.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

The liquid crystal display (LCD) and its fabrication method will now be described in detail with reference to the accompanying drawings.

Figure 1:
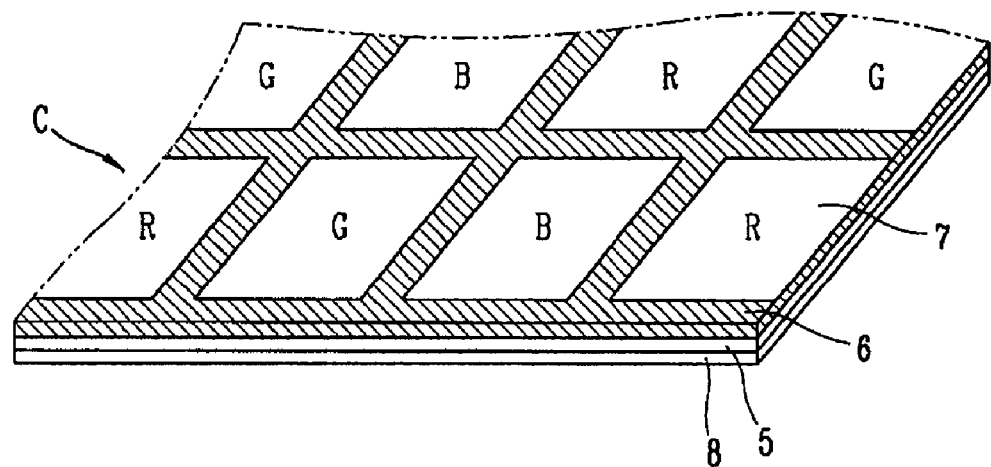
FIG. 1 is an exploded perspective view showing a related art liquid crystal display (LCD)
Figure 1:
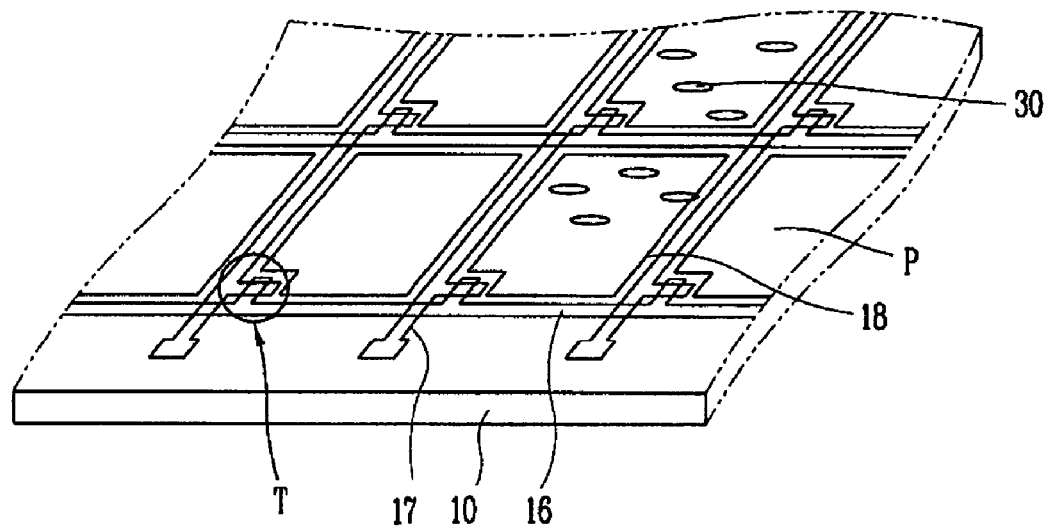
Figure 2A:
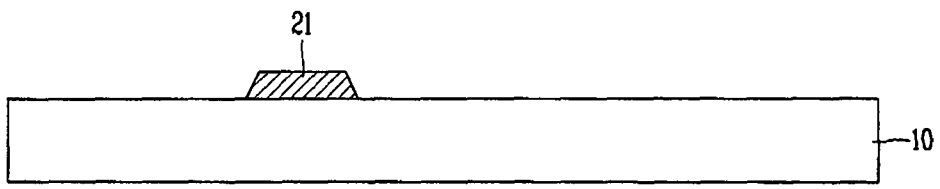
FIGS. 2A to 2E are cross-sectional views sequentially showing a fabrication process of an array substrate of the LCD in FIG. 1.
Figure 2B:
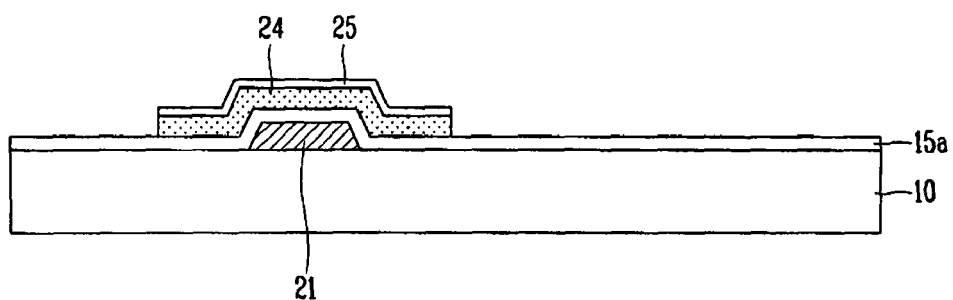
Figure 2C:
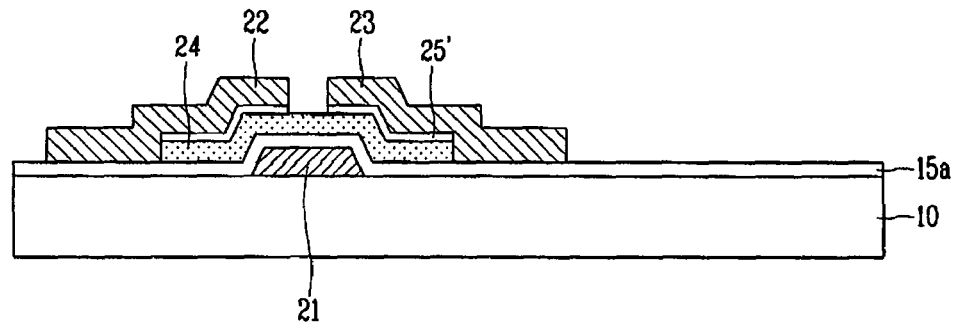
Figure 2D:
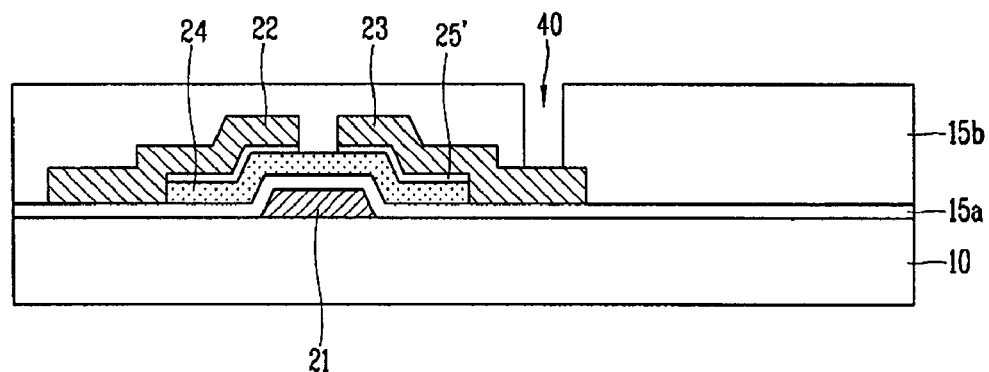
Figure 2E:
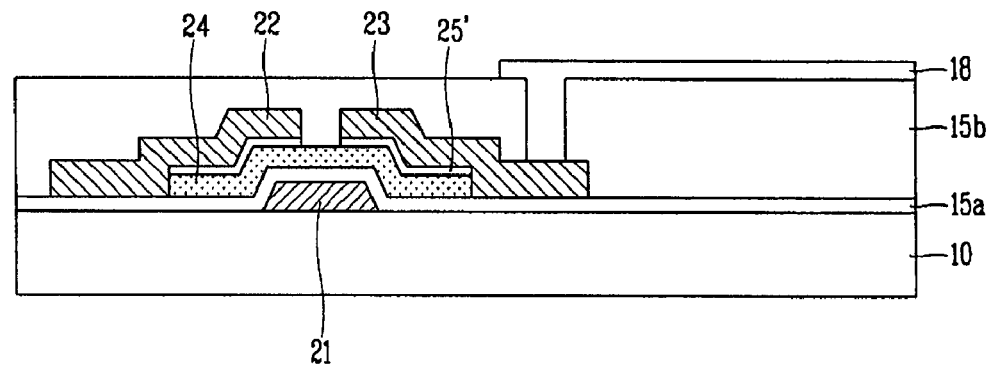
Figure 3:
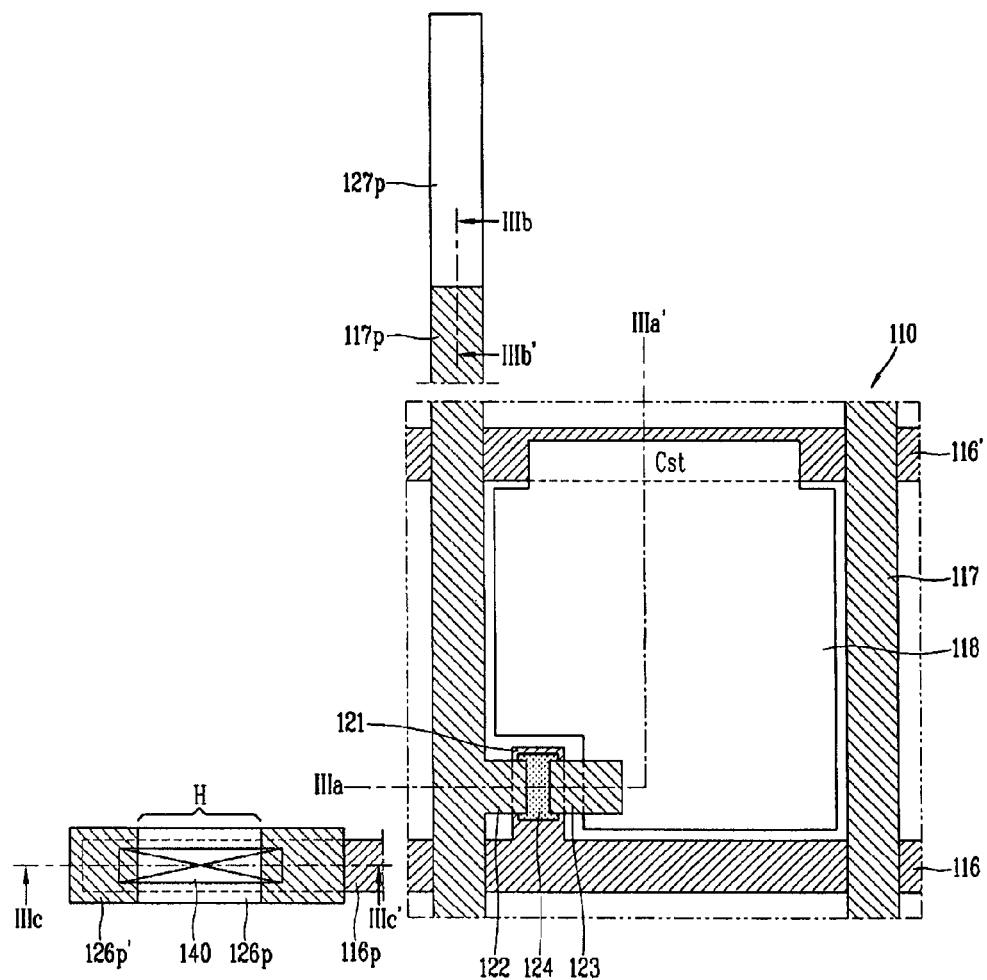
FIG. 3 is a plan view showing a portion of an array substrate of an LCD according to a first exemplary embodiment of the present invention.

FIG. 3 is a plan view showing a portion of an array substrate of an LCD according to a first exemplary embodiment of the present invention, in which a single pixel including a gate pad part and a data pad part are shown for the sake of explanation. Actually, the N number of gate lines and the M number of data lines are formed to cross each other to define the M×N number of pixels. To simplify the explanation only a single pixel is shown. As shown in FIG. 3, gate lines 116 and the data lines 117 are formed to be arranged vertically and horizontally to define the pixel region on an array substrate 110. A thin film transistor (TFT), a switching element, is formed at a crossing of the gate line 116 and the data line 117. A pixel electrode 118 is formed within the pixel region is connected with the TFT to drive liquid crystal molecules (not shown) together with a common electrode of a color filter substrate (not shown).

A gate pad electrode 126p and a data pad electrode 127p are formed at edge portions of the array substrate 110 and electrically connected with the gate line 116 and the data line 117, and transfer a scan signal and a data signal applied from an external driving circuit unit (not shown) to the gate line 116 and the data line 117, respectively. Namely, the gate line 116 and the data line 117 extend to the driving circuit unit so as to be connected with the corresponding gate pad line 116p and the data pad line 117p, and the gate pad line 116p and the data pad line 117p receive the scan signal and the data signal from a driving circuit unit through the gate pad electrode 126p and the data pad electrode 127p electrically connected with the gate pad line 116p and the data pad line 117p. Herein, reference numeral 140 denotes a gate pad part contact hole, and the gate pad electrode 126p is electrically connected with the gate pad line 117p via the gate pad part contact hole 140. Reference letter H denotes a gate pad part open hole, and a portion of the gate pad electrode 126p is exposed via the gate pad part open hole H.

The TFT includes a gate electrode 121 connected with the gate line 116, a source electrode 122 connected with the data line 117, and a drain electrode 123 connected with the pixel electrode 118. The TFT also includes an active pattern 124 for forming a conductive channel between the source and drain electrodes 122 and 123 by a gate voltage supplied to the gate electrode 121. In embodiments of the present invention, the active pattern 124 is formed of an amorphous silicon thin film, and is formed as an island over the gate electrode 121 within boundaries defined by the perimeter of the gate electrode 121 to thus reduce an off current of the TFT.

Lower parts of the source electrode 122, the drain electrode 123 and the data line 117 are made of an opaque conductive material. Further, a source electrode pattern (not shown), a drain electrode pattern (not shown) and a data line pattern (not shown) made of a transparent conductive material are respectively patterned in the same form as the source electrode 122, the drain electrode 123 and the data line 117. A portion of the source electrode 122 extends in one direction to form a portion of the data line 117, and a portion of the drain electrode pattern extends to the pixel region to form the pixel electrode 118. A portion of the previous gate line 116' overlaps a portion of the pixel electrode 118 with a first insulation film (not shown) interposed therebetween to form a storage capacitor Cst.

The storage capacitor Cst serves to uniformly maintain voltage applied to a liquid crystal capacitor until a next signal is received. Namely, the pixel electrode 118 of the array substrate 110 forms the liquid crystal capacitor together with the common electrode of the color filter substrate. However, sometimes the voltage applied to the liquid crystal capacitor is not maintained until the next signal is received but rather leaked. Thus, to uniformly maintain the applied voltage, the storage capacitor Cst should be connected with the liquid crystal capacitor. Besides maintaining the signal, the storage capacitor may also have the effect of stabilizing a gray scale display, reducing flickering effects, reducing the formation of residual images, and the like.

In the LCD according to the first exemplary embodiment of the present invention, the source and drain electrodes 122 and 123, the pixel electrode 118 and the pad part electrodes 126p and 127p are patterned and also the pixel region and the pad part form an opening using a single mask such that the array substrate 110 may be fabricated by performing the masking process a total four times using four masks. The fabrication method of the LCD will now be described as follows.

Figure 4A:
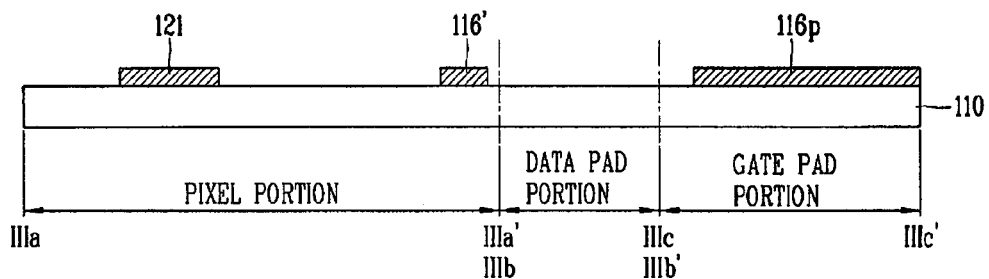
FIGS. 4A to 4D are cross-sectional views sequentially showing a fabrication process taken along lines IIIa-IIIa', IIIb-IIIb' and IIIc-IIIc' of the array substrate in FIG. 3.

FIGS. 4A to 4D are cross-sectional views sequentially showing a fabrication process taken along lines IIIa-IIIa', IIIb-IIIb' and IIIc-IIIc' of the array substrate in FIG. 3. The left side shows the process of fabricating the array substrate of the pixel part and the right side shows the sequential process of fabricating the array substrate of the data pad part and the gate pad part. FIGS. 5A to 5D are plan views sequentially showing the fabrication process of the array substrate in FIG. 3. As shown in FIGS. 4A and 5A, the gate electrode 121 and gate lines 116 and 116' are formed on the pixel part of the array substrate 110 made of a transparent insulation material, such as glass, and the gate pad line 116p is formed on the gate pad part of the array substrate 110. Reference numeral 116' refers to the previous gate line with respect to a corresponding pixel, and the gate line 116 of the corresponding pixel and the previous gate line 116' are formed in the same manner. In this case, the gate electrode 121, the gate lines 116 and 116' and the gate pad line 116p are formed by depositing a first conductive film over the entire surface of the array substrate 110 and selectively patterning it through a photolithography process (the first masking process). Herein, the first conductive film may be made of a low-resistance opaque conductive material, such as aluminum (Al), an aluminum alloy, tungsten (W), copper (Cu), chromium (Cr) and molybdenum (Mo), and the like. Also, the first conductive film may be formed with a multi-layered structure by stacking two or more low-resistance conductive materials.

Figure 4B:
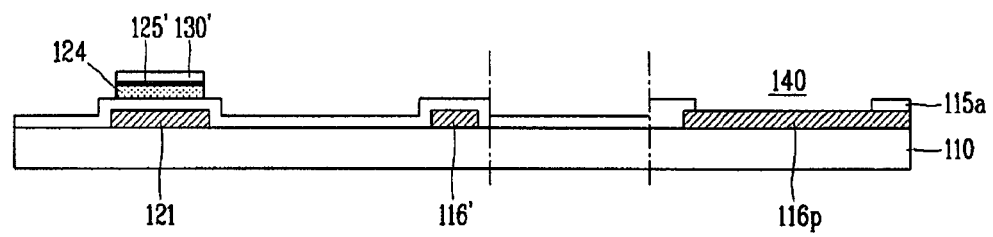
Figure 5A:
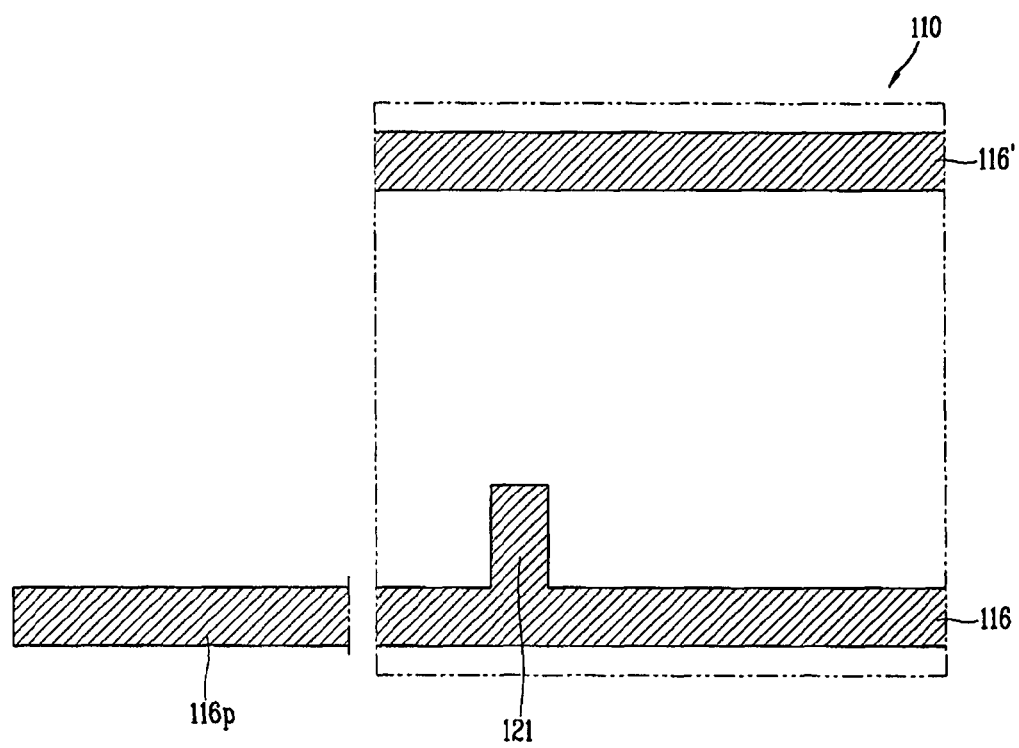
FIGS. 5A to 5D are plan views sequentially showing the fabrication process of the array substrate in FIG. 3.
Figure 5B:
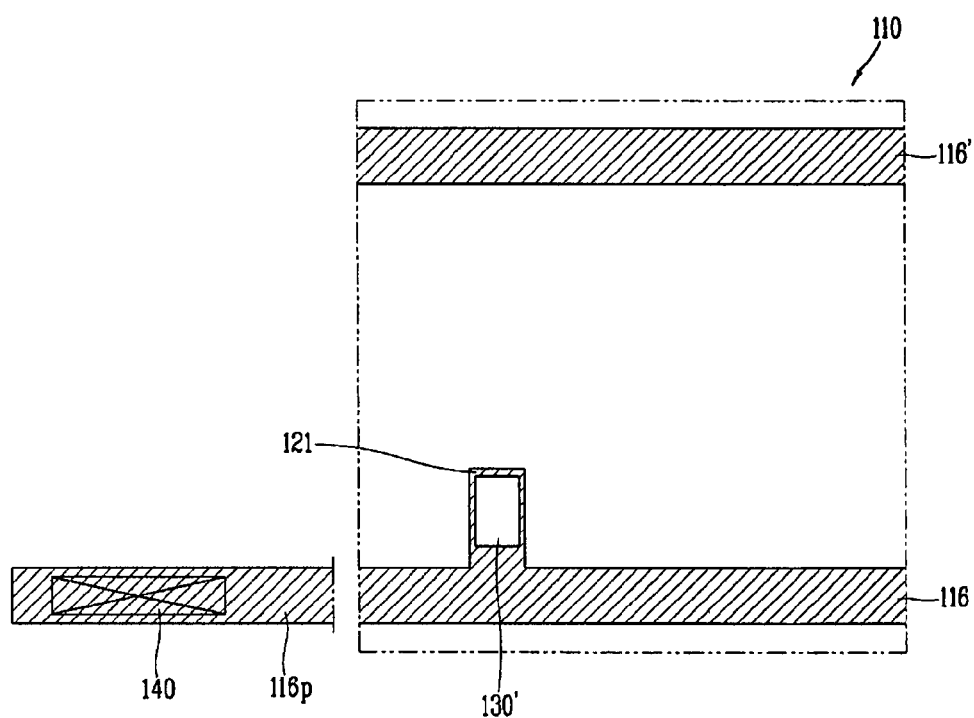

Next, as shown in FIGS. 4B and 5B, a first insulation film 115a, an amorphous silicon thin film, an n+ amorphous silicon thin film and a second conductive film are formed over the entire surface of the array substrate 110 with the gate electrode 121, the gate lines 116 and 116' and the gate pad line 116p formed thereon, and then selectively removed through a photolithography process (a second masking process) to form an active pattern 124 formed of the amorphous silicon thin film over the gate electrode 121 and a gate pad part contact hole 140 exposing a portion of the gate pad line 116p. An n+ amorphous silicon thin film pattern 125' and a conductive film pattern 130', which are formed of the n+ amorphous silicon thin film and the second conductive film having the same pattern as the active pattern 124, remain on the active pattern 124.

In the first exemplary embodiment of the present invention, the gate pad part contact hole 140 may be formed in a direction substantially parallel to the gate pad line 116p. The active pattern 124 is formed as an island over the gate electrode 121 and within boundaries defined by the perimeter of the gate electrode 121 with the first insulation film 115a interposed therebetween. The active pattern 124 and the gate pad part contact hole 140 are formed using a single mask, such as a half-tone mask or a diffraction (slit) mask (hereinafter, it is assumed that referring to the half-tone mask means it also includes the diffraction mask). The second masking process will now be described in detail as follows.

Figure 6A:
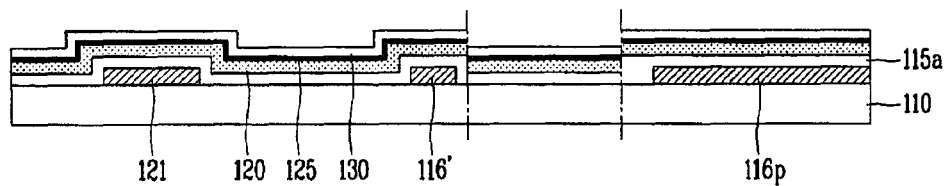
FIGS. 6A to 6F are cross-sectional views substantially showing a second masking process in FIGS. 4B and 5B.

FIGS. 6A to 6F are cross-sectional views showing a second masking process in detail in FIGS. 4B and 5B. As shown in FIG. 6A, the first insulation film 115a, the amorphous silicon thin film 120, the n+ amorphous silicon thin film 125 and the second conductive film 130 are formed over the entire surface of the array substrate 110 with the gate electrode 121, the gate lines 116 and 116' and the gate pad line 116p formed thereon. In this case, the second conductive film 130 is used as a barrier metal layer that reduces contact resistance between an ohmic-contact layer formed on the n+ amorphous silicon thin film and source/drain electrode patterns formed of a transparent conductive film (to be described), and may be formed with a thickness of about 50 Å-100 Å by using a conductive material, such as molybdenum.

Figure 6B:
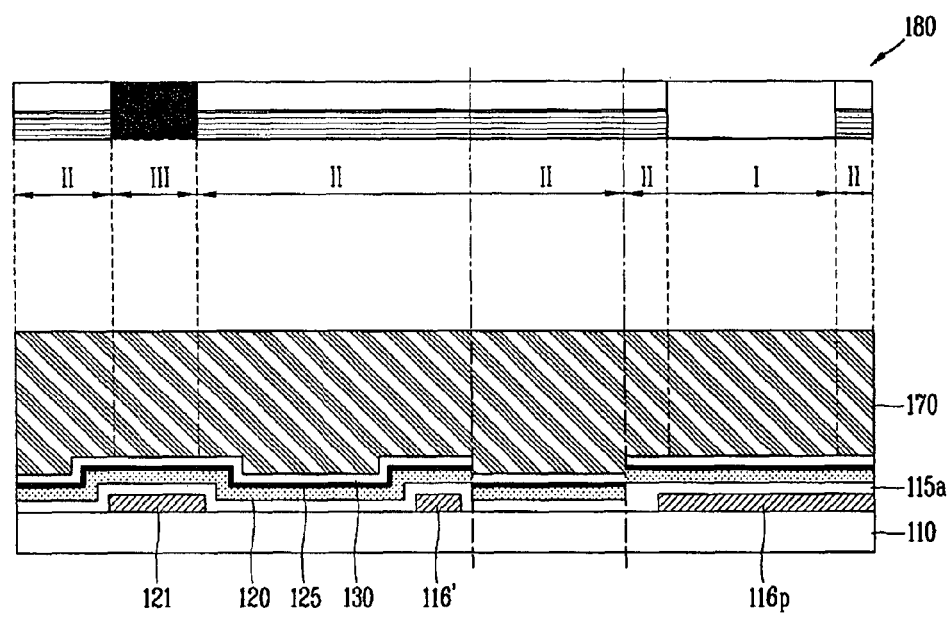

Thereafter, as shown in FIG. 6B, a photosensitive film 170 made of a photosensitive material, such as photoresist is formed over the entire surface of the array substrate 110, on which light is selectively irradiated through the half-tone mask 180. The half-tone mask 180 includes a first transmission region (I) that allows irradiated light to be entirely transmitted therethrough, a second transmission region (II) that allows only light to be partially transmitted therethrough while blocking the remaining light, and a blocking region (III) that entirely blocks the irradiated light. Only light which has transmitted through the half-tone mask 180 may be irradiated onto the photosensitive film 170.

Figure 6C:
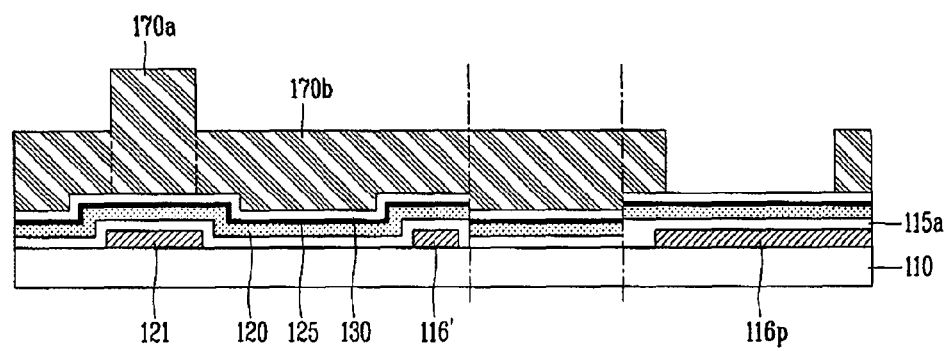

Subsequently, when the photosensitive film 170, which has been exposed through the half-tone mask 180 is developed, as shown in FIG. 6C, first and second photosensitive film patterns 170a and 170b remain at regions where light has been entirely blocked or partially blocked through the blocking region (III) and the second transmission region (II), and the photosensitive film at the transmission region (I) through which light had been entirely transmitted has been completely removed to expose the surface of the second conductive film 130. The first photosensitive film pattern 170a formed at the blocking region (III) is thicker than the second photosensitive film pattern 170b formed through the second transmission region (II). In addition, the photosensitive film at the region where the light had entirely transmitted through the first transmission region (I) has been completely removed. This is because positive photoresist has been used. However, a negative photoresist may be also used in embodiments of the present invention.

Figure 6D:
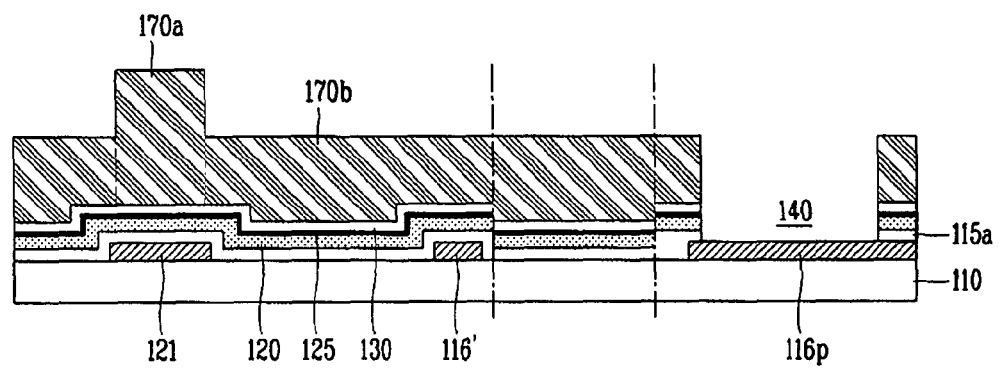

Thereafter, as shown in FIG. 6D, the first insulation film 115a, the amorphous silicon thin film 120, the n+ amorphous silicon thin film 125 and the second conductive film 130 are selectively removed by using the first and second photosensitive film patterns 170a and 170b as masks to form the gate pad part contact hole 140 exposing a portion of the gate pad line 116p at the gate pad part of the array substrate 110. Then, an ashing process is performed to remove a portion of the first photosensitive film pattern 170a and the entirety of the second photosensitive film pattern 170b.

Figure 6E:
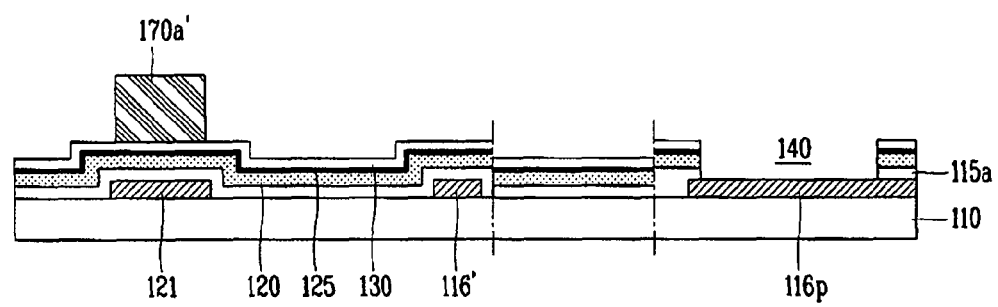

Then, as shown in FIG. 6E, the second photosensitive film pattern of the second transmission region (II) is completely removed. In this case, the first photosensitive film pattern remains as a third photosensitive film pattern 170' by removing the thickness of the second photosensitive film pattern only at the active pattern region corresponding to the blocking region (III).

Figure 6F:
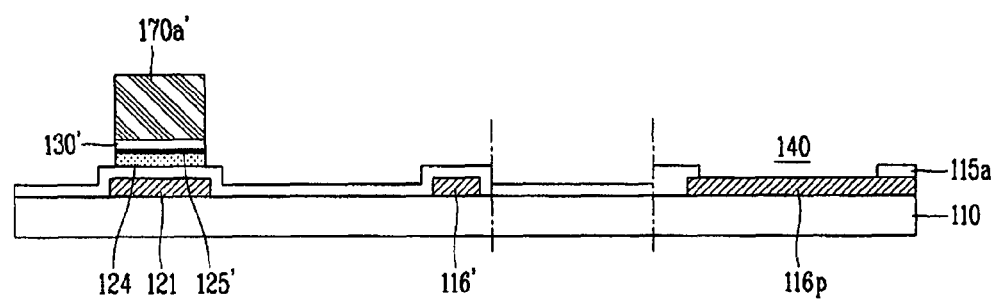

Thereafter, as shown in FIG. 6F, portions of the amorphous silicon thin film, the n+ amorphous silicon thin film and the second conductive film are removed by using the remaining third photosensitive film pattern 170' as a mask to form the active pattern 124 as an island over the gate electrode 121 and within boundaries defined by the perimeter of the gate electrode 121 to thus reduce an off current of the TFT. At this time, the n+ amorphous silicon thin film pattern 125' and the conductive film pattern 130', which are formed of the n+ amorphous silicon thin film and the second conductive film and having been patterned in the same form as the active pattern 124, remain at the upper portion of the active pattern 124, respectively. Thus, the active pattern 124 is formed as an island over the gate electrode 121 and within boundaries defined by the perimeter of the gate electrode 121 to thus reduce an off current of the TFT.

Figure 4C:
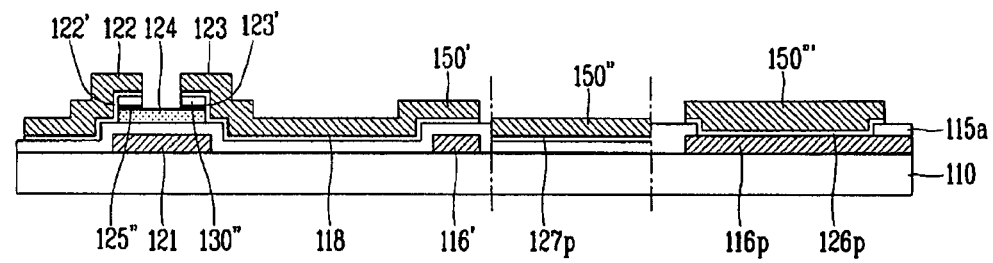
Figure 5C:
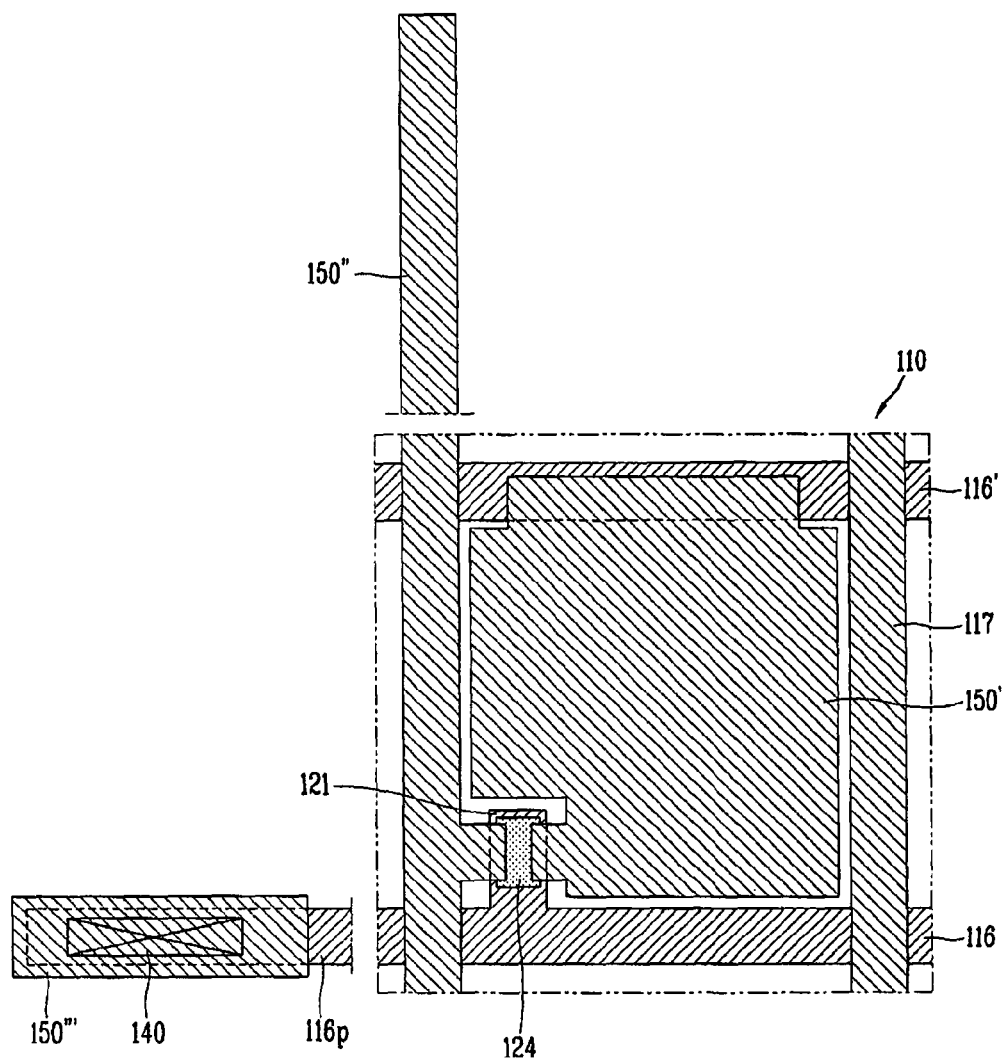

Next, as shown in FIGS. 4C and 5C, third and fourth conductive films are deposited on the entire surface of the array substrate 110 with the active pattern 124 formed thereon, and then portions of them are removed by using a photolithography process (a third masking process) to form the pixel electrode 118 formed of the third conductive film and at the same time to form the source electrode 122, the drain electrode 123 and the data line 117 formed of the fourth conductive film at the pixel part of the array substrate 110. In addition, through the third masking process, the data pad electrode 127p and the gate pad electrode 126p formed of the third conductive film are formed at the data pad part and the gate pad part of the array substrate 110, respectively. In this case, on the lower part of the source electrode 122, the drain electrode 123 and the data line 117, a source electrode pattern 122', a drain electrode pattern 123' and a data line pattern (not shown) are formed from the third conductive film and patterned according to the shape of the source electrode 122, the drain electrode 123 and the data line 117. In addition, a pixel electrode pattern 150', a data pad electrode pattern 150" and a first gate pad electrode pattern 150'" formed of a fourth conductive film and patterned according to the shape of the pixel electrode 118, the data pad electrode 127p and the gate pad electrode 126p remain at the upper portion of the pixel electrode 118, the data pad electrode 127p and the gate pad electrode 126p. Further, a certain region of the n+ amorphous silicon thin film pattern 125' formed on the active pattern 124 is removed through the third masking process to form an ohmic-contact layer 125" that allows the active pattern 124 and the source and drain electrodes 122 and 123 to ohmic-contact with each other, and a barrier metal layer 130" made of the second conductive film and patterned in the same form as the ohmic-contact layer 125" is formed at the upper portion of the ohmic-contact layer 125".

The gate pad electrode 126p is electrically connected with the gate pad line 116p via the gate pad part contact hole 140, and the pixel electrode 118 is connected with the drain electrode pattern 123' so as to be electrically connected with the drain electrode 123. The third conductive film may be made of a transparent conductive material with good transmittance, such as indium-tin-oxide (ITO) or indium-zinc-oxide (IZO), to form the pixel electrode 118, the data pad electrode 127p and the gate pad electrode 126p. The fourth conductive film may be made of low-resistance opaque conductive material, such as aluminum (Al), an aluminum alloy, tungsten (W), copper (Cu), chromium (Cr) and molybdenum (Mo), or the like to form the source electrode 122, the drain electrode 123 and the data line 117.

In the first exemplary embodiment of the present invention, a tail of active pattern formed of the amorphous silicon thin film does not exist at the lower portion of the data line 117, so there is no signal interference to the data line 117 made possible by the tail. For reference, as mentioned above, the tail of the active pattern is formed at the lower portion of the data line during the process of forming the active pattern, the source and drain electrodes and the data line by using the slit mask through the single making process, and because it has width wider than that of the data line, it causes the signal interference to the data line and degradation of an aperture ratio.

Figure 4D:
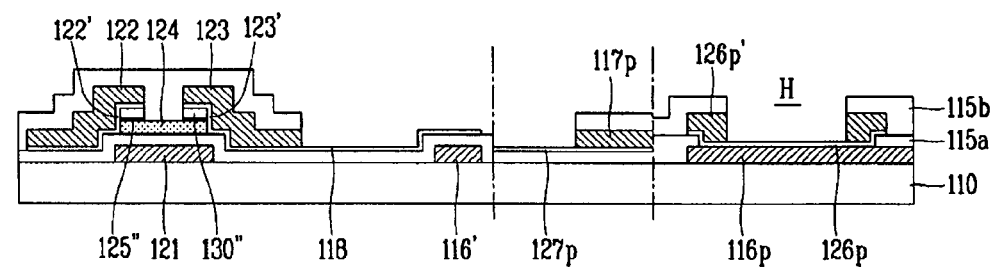
Figure 5D:
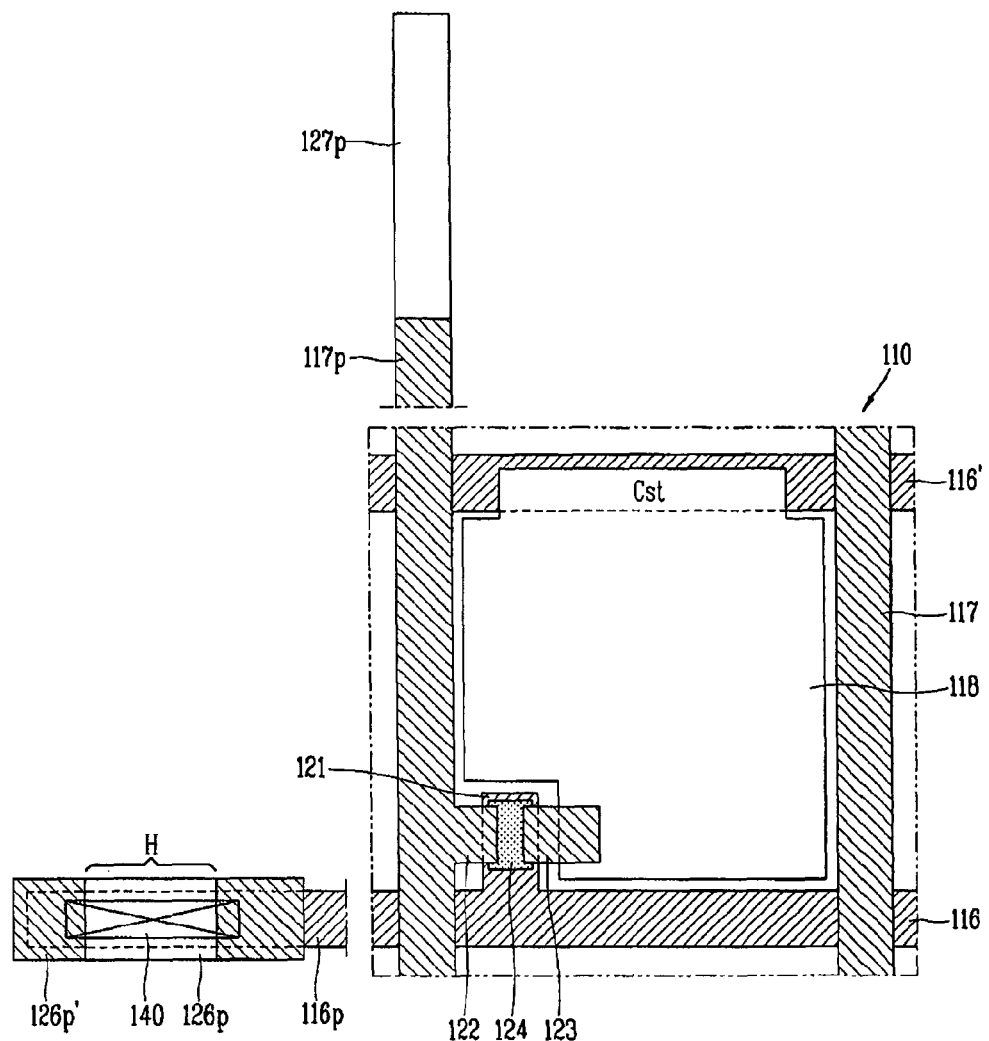

As shown in FIGS. 4D and 5D, the second insulation film 115b is formed over the entire surface of the array substrate 110 and then selectively removed by using a photolithography process (a fourth masking process) to open the pixel region and the pad part. In this case, the second insulation film 115b may be formed to be thin to reduce a cell gap of the LCD related to a response time of liquid crystal. Portions of the pixel electrode pattern, the data pad electrode pattern and the first gate pad electrode pattern are removed through the fourth masking process to partially expose the pixel electrode 118, the data pad electrode 127p and the gate pad electrode 126p. In this case, the data pad electrode pattern and the first gate pad electrode pattern remain as the data pad line 117p and the second gate pad electrode pattern 126p' as portions of them are removed, and the data pad electrode 127p is directly electrically connected with the data pad line 117p. A portion of the corresponding pixel electrode 118 overlaps a portion of the previous gate line 116' to form a storage capacitor Cst together with the previous gate line 116' with the first insulation film 115a interposed therebetween. Reference letter H denotes a gate pad part open hole exposing a portion of the gate pad electrode 126p.

In the first exemplary embodiment of the present invention, when the gate pad part open hole (or opening) is formed by opening (or exposing a portion of) the gate pad part, an etching solution may penetrate the lower third conductive film, namely, the gate pad electrode 126p, such that a portion of the gate pad line 116p may be etched away during the process of etching the fourth conductive film.

Figure 7:
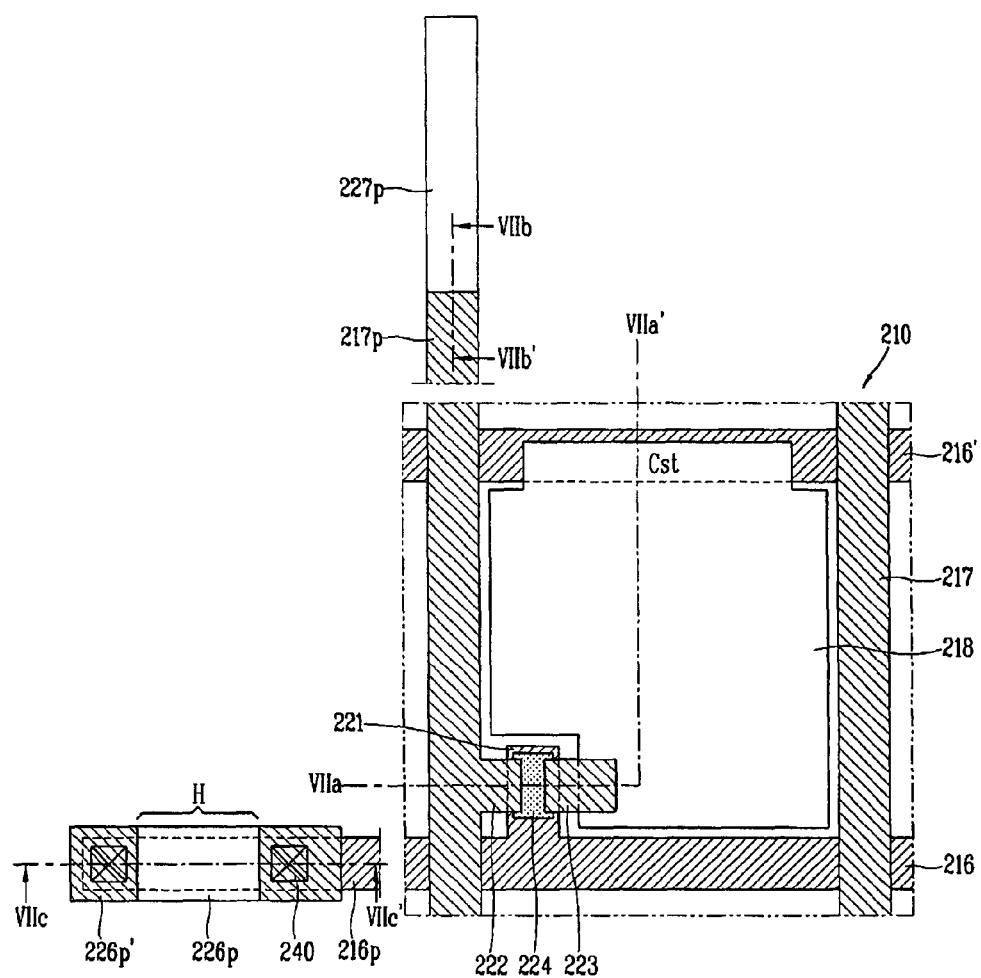
FIG. 7 is a plan view schematically showing a portion of an array substrate of an LCD according to a second exemplary embodiment of the present invention.

FIG. 7 is a plan view schematically showing a portion of an array substrate of an LCD according to a second exemplary embodiment of the present invention, which has the same structure as the array substrate according to the first exemplary embodiment of the present invention except for the gate pad part. That is, by forming the gate pad part contact hole exposing a portion of the gate pad line and the gate pad part open hole at different positions, the gate pad line may be prevented from being etched during the process of opening the gate pad part open hole. As shown in FIG. 7, gate lines 216 and the data lines 217 are arranged vertically and horizontally to define the pixel region on an array substrate 210. A thin film transistor (TFT), a switching element, is formed at a crossing of the gate line 216 and the data line 217. A pixel electrode 218 is formed within the pixel region ands connected with the TFT to drive liquid crystal molecules (not shown) together with a common electrode of a color filter substrate (not shown).

A gate pad electrode 226p and a data pad electrode 227p are formed at edge portions of the array substrate 210 and electrically connected with the gate line 216 and the data line 217 to respectively transfer a scan signal and a data signal applied from an external driving circuit unit (not shown) to the gate line 216 and the data line 217, respectively. More specifically, the gate line 216 and the data line 217 extend to the driving circuit unit so as to be connected with the corresponding gate pad line 216p and the data pad line 217p. The gate pad line 216p and the data pad line 217p receive the scan signal and the data signal from a driving circuit unit through the gate pad electrode 226p and the data pad electrode 227p electrically connected with the gate pad line 216p and the data pad line 217p. Reference numeral 240 denotes a gate pad part contact hole. The gate pad electrode 226p is electrically connected with the gate pad line 217p via the gate pad part contact hole 240. Reference letter H denotes a gate pad part open hole, and a portion of the gate pad electrode 226p is exposed via the gate pad part open hole H. Herein, in the LCD according to the second embodiment of the present invention, the gate pad part contact hole 240 and the gate pad part open hole H are each formed at different positions.

The TFT includes a gate electrode 221 connected with the gate line 216, a source electrode 222 connected with the data line 217, and a drain electrode 223 connected with the pixel electrode 218. The TFT also includes an active pattern 224 for forming a conductive channel between the source and drain electrodes 222 and 223 by a gate voltage supplied to the gate electrode 221. At a lower portion of the source electrode 222, the drain electrode 223 and the data line 217 made of an opaque conductive material, there are formed a source electrode pattern (not shown), a drain electrode pattern (not shown) and a data line pattern (not shown) made of a transparent conductive material and patterned in the same form as the source electrode 222, the drain electrode 223 and the data line 217, respectively. A portion of the source electrode 222 extends in one direction to form a portion of the data line 217, and a portion of the drain electrode pattern extends to the pixel region to form the pixel electrode 218. A portion of the previous gate line 216' overlaps a portion of the pixel electrode 218 with a first insulation film (not shown) interposed therebetween to form a storage capacitor Cst.

As stated above, in the second exemplary embodiment of the present invention, because the gate pad part contact hole 240 and the gate pad part open hole H are each formed at different positions relative to each other, when the gate pad part is opened, the gate pad line 216p may be prevented from being etched away. This will now be described in detail through a fabrication method of the LCD as follows.

Figure 8A:
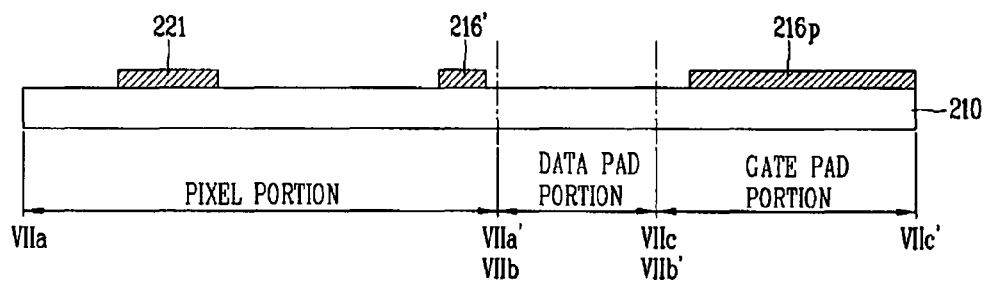
FIGS. 8A to 8D are cross-sectional views sequentially showing a fabrication process taken along lines VIIa-VIIa', VIIb-VIIb' and VIIc-VIIc' of the array substrate in FIG. 7.

FIGS. 8A to 8D are cross-sectional views sequentially showing a fabrication process taken along lines VIIa-VIIa', VIIb-VIIb' and VIIc-VIIc' of the array substrate in FIG. 7. The left side of these figures shows the process of fabricating the array substrate of the pixel part and the right side shows the sequential process of fabricating the array substrate of the data pad part and the gate pad part. As shown in FIG. 8A, the gate electrode 221 and the gate lines 216' are formed on the pixel part of the array substrate 210 made of a transparent insulation material, such as glass, and the gate pad line 216p is formed on the gate pad part of the array substrate 210. Reference numeral 216' refers to the previous gate line with respect to a corresponding pixel, and a gate line (not shown) of the corresponding pixel and the previous gate line 216' are formed in the same manner. In this case, the gate electrode 221, the gate line 216' and the gate pad line 216p are formed by depositing a first conductive film over the entire surface of the array substrate 210 and selectively patterning it through a photolithography process (a first masking process).

Figure 8B:
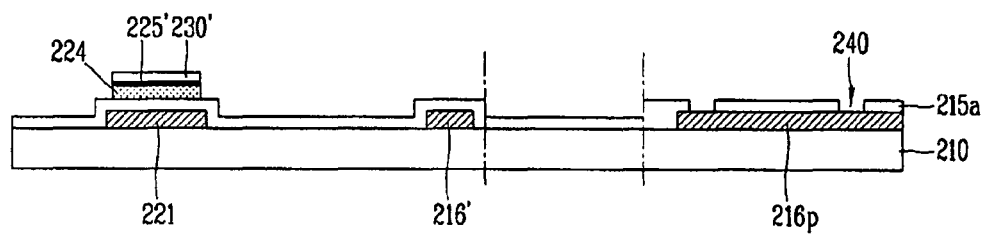

Next, as shown in FIG. 8B, a first insulation film 215a, an amorphous silicon thin film, an n+ amorphous silicon thin film and a second conductive film are formed over the entire surface of the array substrate 210 of the array substrate 210 with the gate electrode 221, the gate line 216' and the gate pad line 216p formed thereon, and then selectively removed through a photolithography process (a second masking process) to form an active pattern 224 formed of the amorphous silicon thin film at an upper portion of the gate electrode 221 and a gate pad part contact hole 240 exposing a portion of the gate pad line 216p. At this time, an n+ amorphous silicon thin film pattern 225' and a conductive film pattern 230', which are formed of the n+ amorphous silicon thin film and the second conductive film and have been patterned in the same form as the active pattern 224, remain on the active pattern 224, respectively.

In the second exemplary embodiment of the present invention, at least one gate pad part contact hole 240 may be formed at both sides of the gate pad line 216p, but in other embodiments of the present invention, the gate pad part contact hole 240 may be formed without being limited in the number. Herein, likewise as in the first exemplary embodiment of the present invention, in the second exemplary embodiment of the present invention, the active pattern 224 is formed as an island directly over the gate electrode 221 with the first insulation film 215a interposed therebetween, and the active pattern 224 and the gate pad part contact hole 240 are formed using a single mask (the second masking process) by using a half-tone mask, for example.

Figure 8C:
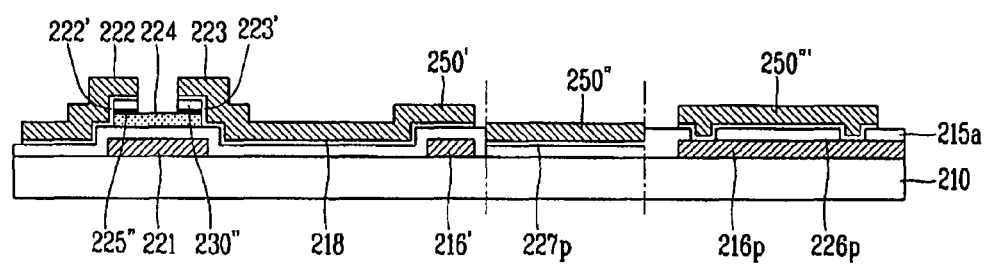

Next, as shown in FIG. 8C, third and fourth conductive films are deposited on the entire surface of the array substrate 210 with the active pattern 224 formed thereon, and then portions of them are removed by using a photolithography process (a third masking process) to form the pixel electrode 218 formed of the third conductive film and at the same time to form the source electrode 222, the drain electrode 223 and the data line (not shown) formed of the fourth conductive film at the pixel part of the array substrate 210. In addition, through the third masking process, the data pad electrode 227p and the gate pad electrode 226p formed of the third conductive film are formed at the data pad part and the gate pad part of the array substrate 210. In this case, at the lower portion of the source electrode 222, the drain electrode 223 and the data line, there are formed a source electrode pattern 222', a drain electrode pattern 223' and a data line pattern (not shown) formed of the third conductive film and patterned according to the shape of the source electrode 222, the drain electrode 223 and the data line, respectively. In addition, a pixel electrode pattern 250', a data pad electrode pattern 250" and a first gate pad electrode pattern 250''' formed of a fourth conductive film and patterned according to the shape of the pixel electrode 218, the data pad electrode 227p and the gate pad electrode 226p remain at the upper portion of the pixel electrode 218, the data pad electrode 227p and the gate pad electrode 226p, respectively.

A certain region of the n+ amorphous silicon thin film pattern formed on the active pattern 224 is removed through the third masking process to form an ohmic-contact layer 225" that allows the active pattern 224 and the source and drain electrodes 222 and 223 to ohmic-contact with each other, and a barrier metal layer 230" made of the second conductive film and patterned in the same form as the ohmic-contact layer 225" is formed at the upper portion of the ohmic-contact layer 225".

In this case, the gate pad electrode 226p is electrically connected with the gate pad line 216p via the gate pad part contact hole 240, and the pixel electrode 218 is electrically connected with the drain electrode 223 via the drain electrode pattern 223'. The first insulation film 215a is interposed between the gate pad electrode 226p and the gate pad line 216p where the gate pad part contact holes 240 are not positioned.

Figure 8D:
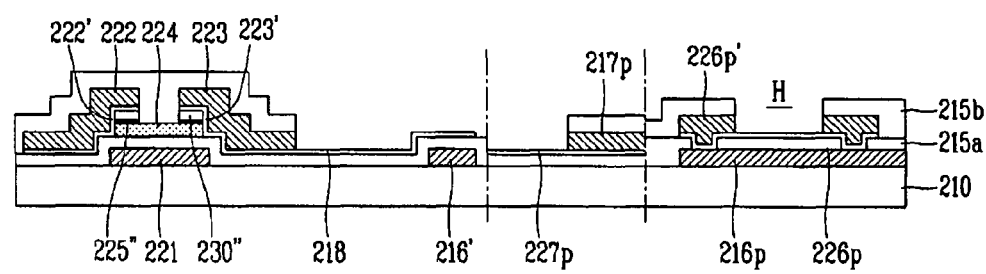

And then, as shown in FIG. 8D, the second insulation film 215b is formed over the entire surface of the array substrate 210 and then selectively removed by using a photolithography process (a fourth masking process) to expose the pixel region and make the gate pad part open hole exposing a portion of the gate pad electrode 226p. Portions of the pixel electrode pattern 250', the data pad electrode pattern 250" and the first gate pad electrode pattern 250''' are removed through the fourth masking process to partially expose the pixel electrode 218, the data pad electrode 227p and the gate pad electrodes 226p. A portion of the corresponding pixel electrode 218 overlaps a portion of the previous gate line 216' to form a storage capacitor Cst together with the previous gate line 216' with the first insulation film 215a interposed therebetween. In this case, the data pad electrode pattern and the first gate pad electrode pattern remain as the data pad line 217p and the second gate pad electrode pattern 226p' as portions of them are removed, and the data pad electrode 227p is directly electrically connected with the data pad line 217p. Herein, reference letter H denotes a gate pad part open hole exposing a portion of the gate pad electrode 226p.

In the second exemplary embodiment of the present invention, because the gate pad part open hole H is formed offset from where the gate pad part contact hole is formed such that a region of the first insulation film 215a is interposed between the gate pad electrode 226p and the gate pad line 216p underneath gate pad part open hole H. Although the third conductive film, namely, the gate pad electrode 226p may be partially etched in the process of etching the fourth conductive film, the phenomenon that the gate pad line 216p is eroded cannot occur because of the location of the first insulation film 215a on the gate pad line 216p. In the second exemplary embodiment of the present invention, when an auto-probe testing process is performed, current flows only to the gate pad electrode 226p made of the transparent conductive film, a signal delay can occur due to resistance.

An LCD and its fabrication method capable of preventing the gate pad line from being etched away and for preventing signal delay according to a third exemplary embodiment of the present invention will now be described with reference to the accompanying drawings.

Figure 9:
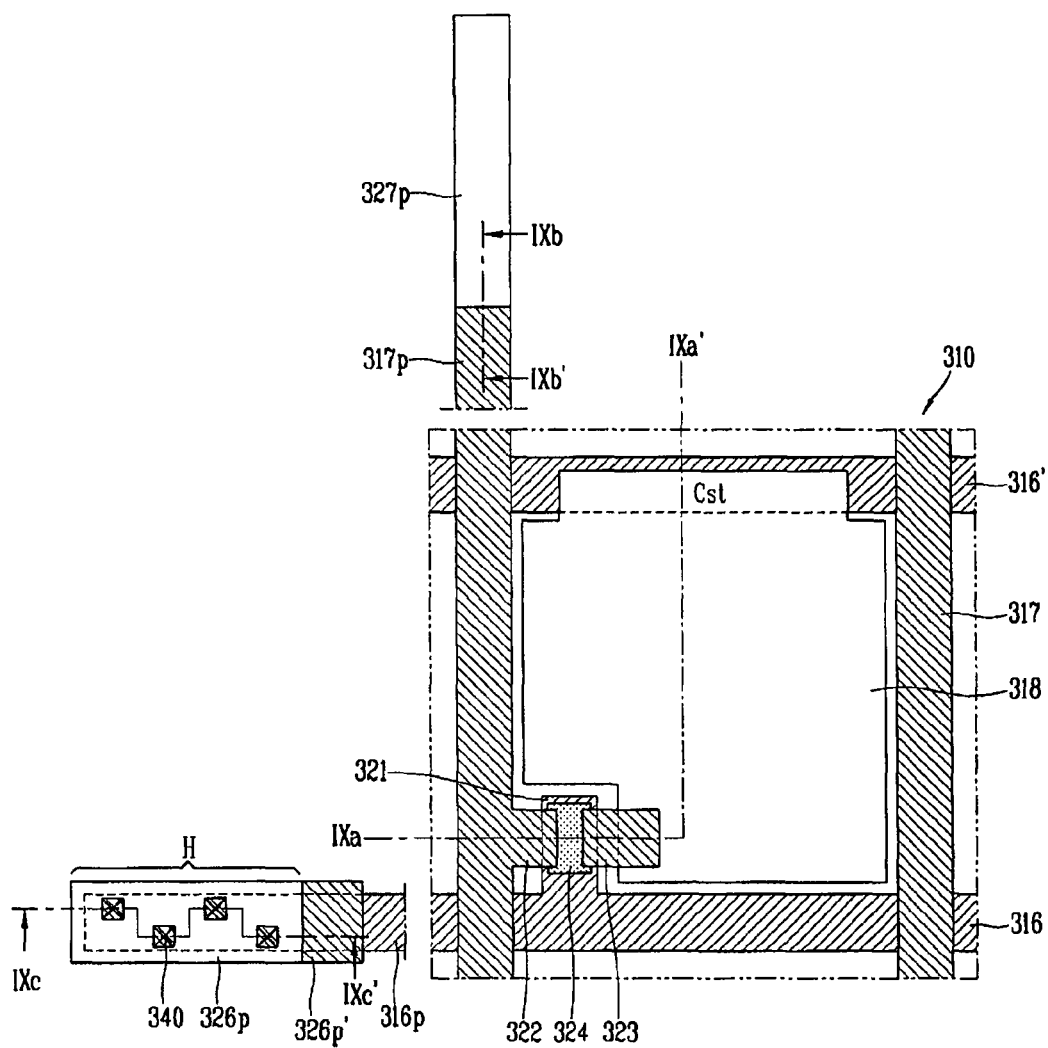
FIG. 9 is a plan view schematically showing a portion of an array substrate of an LCD according to a third exemplary embodiment of the present invention.

FIG. 9 is a plan view schematically showing a portion of an array substrate of an LCD according to a third exemplary embodiment of the present invention, which has the same structure as the array substrate of the first and second exemplary embodiments of the present invention, except for the structure of the gate pad part. Namely, in the third exemplary embodiment of the present invention, when the second insulation film is etched, it remains at the upper portion of the gate pad part contact hole to thus prevent the gate pad line from being etched away, and a plurality of gate pad part contact holes are formed to strengthen connection of the gate pad line and the gate pad electrode to thus prevent a signal delay.

As shown, the gate lines 316 and the data lines 317 are formed to be arranged vertically and horizontally to define the pixel region on an array substrate 310. A thin film transistor (TFT), a switching element, is formed at a crossing of the gate line 316 and the data line 317. A pixel electrode 318 formed within the pixel region, is connected with the TFT to drive liquid crystal molecules (not shown) together with a common electrode of a color filter substrate (not shown). A gate pad electrode 326p and a data pad electrode 327p are formed at edge portions of the array substrate 310 and electrically connected with the gate line 316 and the data line 317, and transfer a scan signal and a data signal applied from an external driving circuit unit (not shown) to the gate line 316 and the data line 317, respectively. More specifically, the gate line 316 and the data line 317 extend to the driving circuit unit so as to be connected with the corresponding gate pad line 316p and the data pad line 317p. The gate pad line 316p and the data pad line 317p receive the scan signal and the data signal from a driving circuit unit through the gate pad electrode 326p and the data pad electrode 327p electrically connected with the gate pad line 316p and the data pad line 317p.

Reference numeral 340 denotes a gate pad part contact hole, and the gate pad electrode 326p is electrically connected with the gate pad line 317p via the gate pad part contact hole 340. Reference letter H denotes a gate pad part open hole, and a portion of the gate pad electrode 326p is exposed via the gate pad part open hole H. In the third embodiment of the present invention, a plurality of gate pad part contact holes 340 (preferably, three or more gate pad part open holes) are formed at the region where the gate pad part open hole H is positioned, and in this case, the second insulation film (not shown) remains at the upper portion of the gate pad part contact hole 340.

The TFT includes a gate electrode 321 connected with the gate line 316, a source electrode 322 connected with the data line 317, and a drain electrode 323 connected with the pixel electrode 318. The TFT also includes an active pattern 324 for forming a conductive channel between the source and drain electrodes 322 and 323 by a gate voltage supplied to the gate electrode 321. A lower part of the source electrode 322, the drain electrode 323 and the data line 317 are made of an opaque conductive material. A source electrode pattern (not shown), a drain electrode pattern (not shown) and a data line pattern (not shown) made of a transparent conductive material are formed and patterned the same as the source electrode 322, the drain electrode 323 and the data line 317, respectively. A portion of the source electrode 322 extends in one direction to form a portion of the data line 317, and a portion of the drain electrode pattern extends to the pixel region to form the pixel electrode 318. A portion of the previous gate line 316' overlaps with a portion of the pixel electrode 318 with a first insulation film (not shown) interposed therebetween to form a storage capacitor Cst.

As mentioned above, in the third exemplary embodiment of the present invention, because the second insulation film remains at the upper portion of the gate pad part contact hole 340 when etched, the gate pad line 316p may be prevented from being etched away, and also the plurality of gate pad part contact holes 340 are formed to strengthen the connection of the gate pad line 316 and the gate pad electrode 326p to thus prevent a signal delay. The fabrication method of the LCD will now be described in detail as follows.

Figure 10A:
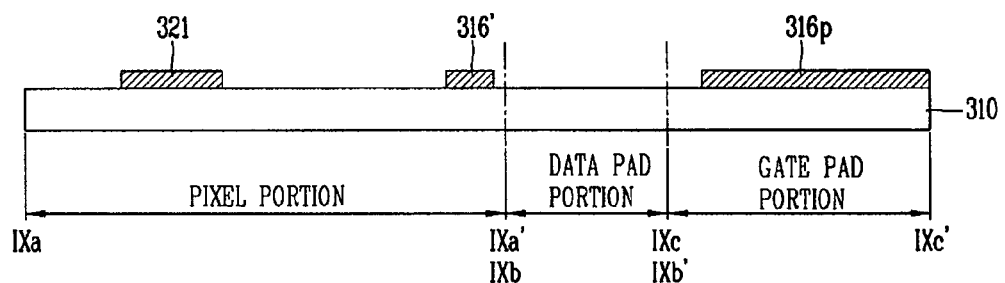
FIGS. 10A to 10D are cross-sectional views sequentially showing a fabrication process taken along lines IXa-IXa', IXb-IXb' and IXc-IXc' of the array substrate in FIG. 9.

FIGS. 10A to 10D are cross-sectional views sequentially showing a fabrication process taken along lines IXa-IXa', IXb-IXb' and IXc-IXc' of the array substrate in FIG. 9. The left side shows the process of fabricating the array substrate of the pixel part and the right side shows the sequential process of fabricating the array substrate of the data pad part and the gate pad part. As shown in FIG. 10A, the gate electrode 321 and the gate lines 316' are formed on the pixel part of the array substrate 310 made of the transparent insulation material such as glass, and the gate pad line 316p is formed on the gate pad part of the array substrate 310. Reference numeral 316' refers to the previous gate line with respect to a corresponding pixel, and a gate line (not shown) of the corresponding pixel and the previous gate line 316' are formed in the same manner. In this case, the gate electrode 321, the gate line 316' and the gate pad line 316p are formed by depositing a first conductive film on the entire surface of the array substrate 310 and selectively patterning it through a photolithography process (a first masking process).

Figure 10B:
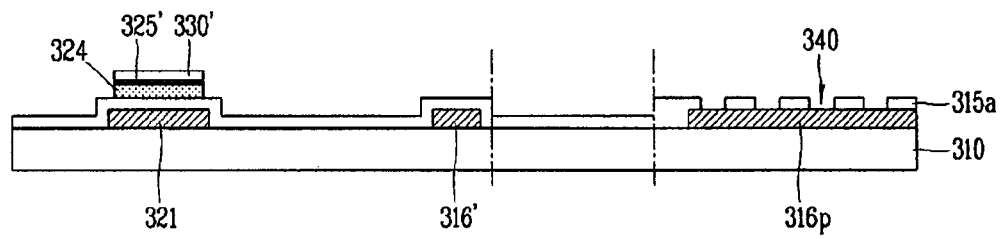

Next, as shown in FIG. 10B, a first insulation film 315a, an amorphous silicon thin film, an n+ amorphous silicon thin film and a second conductive film are formed on the entire surface of the array substrate 310 of the array substrate 310 with the gate electrode 321, the gate line 316' and the gate pad line 316p formed thereon, and then selectively removed through a photolithography process (a second masking process) to form an active pattern 324 formed of the amorphous silicon thin film at an upper portion of the gate electrode 321 and at the same time to form a gate pad part contact hole 340 exposing a portion of the gate pad line 316p. At this time, an n+ amorphous silicon thin film pattern 325' and a conductive film pattern 330', which are formed of the n+ amorphous silicon thin film and the second conductive film and have been patterned in the same form as the active pattern 324, remain on the active pattern 324, respectively.

In the second exemplary embodiment of the present invention, at least one gate pad part contact hole 340 may be formed at both sides of the gate pad line 316p, but in the present embodiment, a plurality of gate pad part contact holes may be formed without being limited in number. Herein, likewise as in the first exemplary embodiment of the present invention, in the third exemplary embodiment of the present invention, the active pattern 324 is formed as an island directly over the gate electrode 321 with the first insulation film 315a interposed therebetween, and the active pattern 324 and the gate pad part contact hole 340 are formed using a single mask (the second masking process) by using the half-tone mask, for example.

Figure 10C:
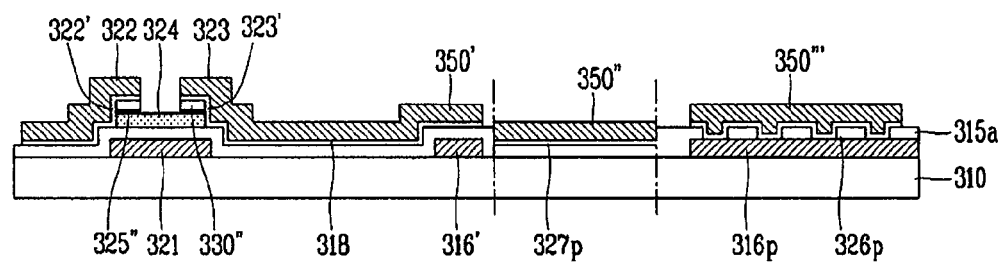

Next, as shown in FIG. 10C, third and fourth conductive films are deposited on the entire surface of the array substrate 310 with the active pattern 324 formed thereon, and then portions of them are removed by using a photolithography process (a third masking process) to form the pixel electrode 318 formed of the third conductive film and at the same time to form the source electrode 322, the drain electrode 323 and the data line (not shown) formed of the fourth conductive film at the pixel part of the array substrate 310. In addition, through the third masking process, the data pad electrode 327p and the gate pad electrode 326p formed of the third conductive film are formed at the data pad part and the gate pad part of the array substrate 310. In this case, at the lower portion of the source electrode 322, the drain electrode 323 and the data line, there are formed a source electrode pattern 322', a drain electrode pattern 323' and a data line pattern (not shown) formed of the third conductive film and patterned according to the shape of the source electrode 322, the drain electrode 323 and the data line, respectively.

A certain region of the n+ amorphous silicon thin film pattern formed on the active pattern 324 is removed through the third masking process to form an ohmic-contact layer 325" that allows the active pattern 324 and the source and drain electrodes 322 and 323 to ohmic-contact with each other, and a barrier metal layer 230" made of the second conductive film and patterned in the same form as the ohmic-contact layer 325" is formed at the upper portion of the ohmic-contact layer 325".

A pixel electrode pattern 350', a data pad electrode pattern 350" and a first gate pad electrode pattern 350'" formed of a fourth conductive film and patterned according to the shape of the pixel electrode 318, the data pad electrode 327p and the gate pad electrode 326p remain at the upper portion of the pixel electrode 318, the data pad electrode 327p and the gate pad electrode 326p. In this case, the gate pad electrode 326p is electrically connected with the gate pad line 316p via the gate pad part contact hole 340, and the pixel electrode 318 is electrically connected with the drain electrode 323 via the drain electrode pattern 323'. The first insulation film 315a is interposed between the gate pad electrode 326p and the gate pad line 316p where the gate pad part contact hole is not positioned.

Figure 10D:
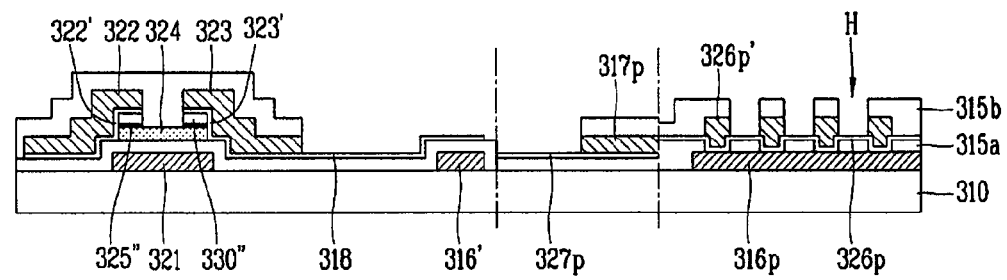

And then, as shown in FIG. 10D, the second insulation film 315b is formed on the entire surface of the array substrate 310 and then selectively removed by using a photolithography process (a fourth masking process) to open the pixel region and the pad part. Portions of the pixel electrode pattern, the data pad electrode pattern and the first gate pad electrode pattern are removed through the fourth masking process to partially expose the pixel electrode 318, the data pad electrode 327p and the gate pad electrodes 326p. In this case, the data pad electrode pattern and the first gate pad electrode pattern remain as the data pad line 317p and the second gate pad electrode pattern 326p' as portions of them are removed, and the data pad electrode 327p is directly electrically connected with the data pad line 317p.

A portion of the corresponding pixel electrode 318 overlaps with a portion of the previous gate line 316' to form a storage capacitor Cst together with the previous gate line 316' with the first insulation film 315a interposed therebetween. Herein, reference letter H denotes a gate pad part open hole exposing a portion of the gate pad electrode 326p.

As mentioned above, in the third exemplary embodiment of the present invention, when the second insulation film 315b is etched, the second insulation film 315b remains at the upper portion of the gate pad part contact hole 340 and the first insulation film 315a is interposed between the gate pad electrode 326p and the gate pad line 316p to prevent the gate pad line 316p from being etched away in the process of performing the fourth masking process. In addition, the plurality of gate pad part contact holes 340 are formed to strength a connection of the gate pad line 316p and the gate pad electrode 326p to thus prevent a signal delay. Herein, the gate pad part contact holes may be formed at dummy regions on left and right sides of the gate pad electrode where the gate pad electrode is not positioned to secure a contact area of the auto-probe. This will be described in detail in a fourth exemplary embodiment of the present invention.

Figure 11:
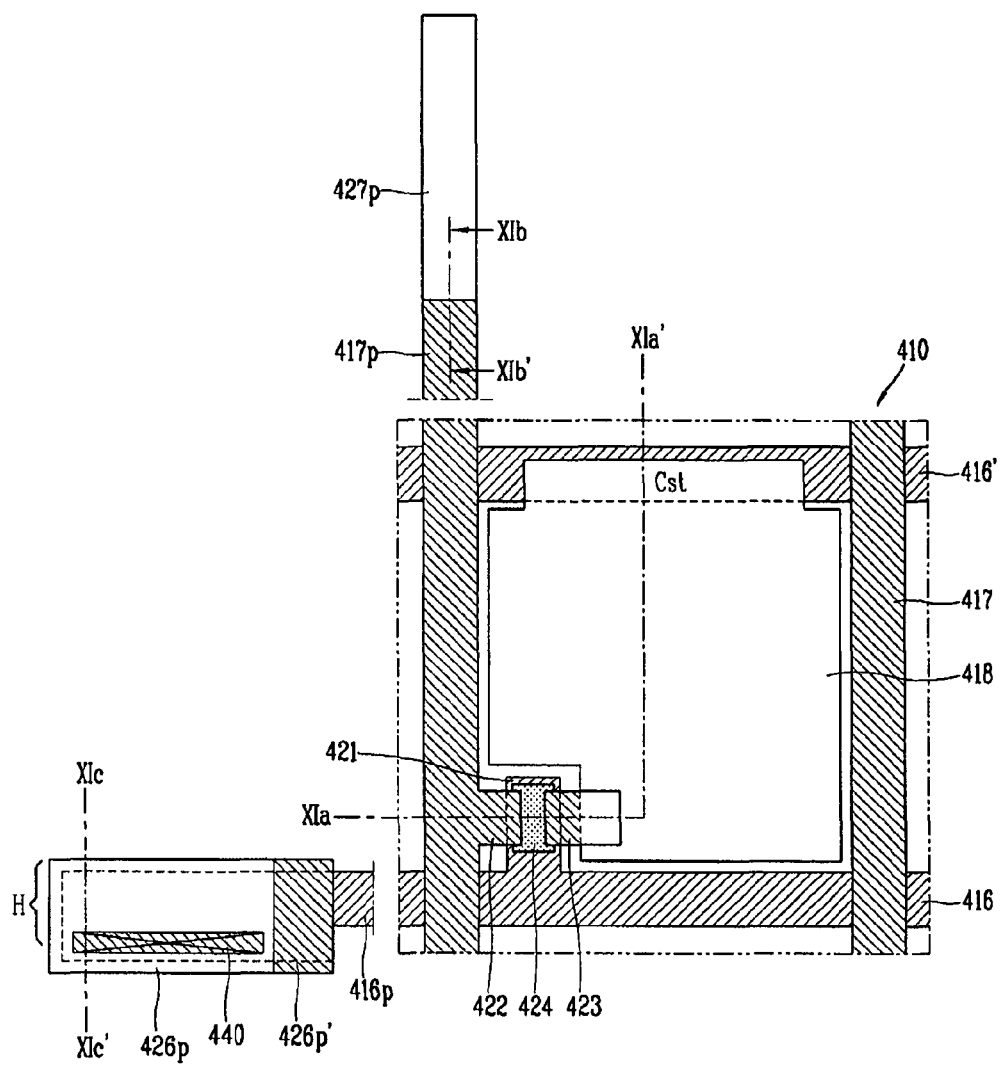
FIG. 11 is a plan view schematically showing a portion of an array substrate of an LCD according to a fourth exemplary embodiment of the present invention.

FIG. 11 is a plan view schematically showing a portion of an array substrate of an LCD according to a fourth exemplary embodiment of the present invention, which has the same structure as the array substrates of the first, second and third exemplary embodiments of the present invention, except for the structure of the gate pad part.

Figure 12:
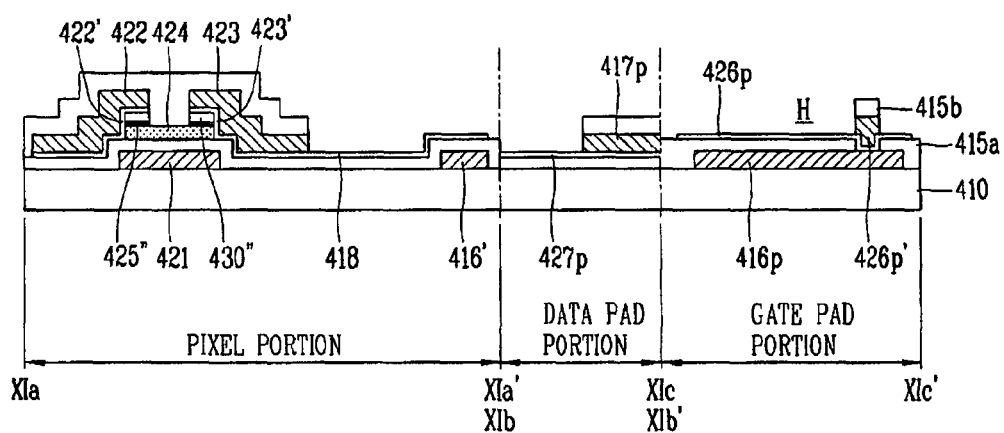
FIG. 12 is a cross-sectional view showing a fabrication process taken along lines IXa-IXa', IXb-IXb' and IXc-IXc' of the array substrate in FIG. 7.

FIG. 12 is a cross-sectional view showing a fabrication process taken along lines IXa-IXa', IXb-IXb' and IXc-IXc' of the array substrate in FIG. 7. That is, in the fourth exemplary embodiment of the present invention, when the second insulation film is etched, it only remains on the upper portion of the gate pad part in the contact hole to prevent the gate pad line from being etched away, and the gate pad part contact holes are formed at the dummy region of the left and right sides of the gate pad electrode where the gate pad electrode is not positioned to secure the contact area of the auto-probe.

As shown, gate lines 416 and the data lines 417 are formed to be arranged vertically and horizontally to define the pixel region on an array substrate 410. A thin film transistor (TFT), a switching element, is formed at a crossing of the gate line 416 and the data line 417. A pixel electrode 418 is formed within the pixel region, is connected with the TFT to drive liquid crystal (not shown) together with a common electrode of a color filter substrate (not shown).

A gate pad electrode 426p and a data pad electrode 427p are formed at edge portions of the array substrate 410 and electrically connected with the gate line 416 and the data line 417, and transfer a scan signal and a data signal applied from an external driving circuit unit (not shown) to the gate line 416 and the data line 417, respectively. More specifically, the gate line 416 and the data line 417 extend to the driving circuit unit so as to be connected with the corresponding gate pad line 416p and the data pad line 417p, and the gate pad line 416p and the data pad line 417p receive the scan signal and the data signal from a driving circuit unit through the gate pad electrode 426p and the data pad electrode 427p electrically connected with the gate pad line 416p and the data pad line 417p. Herein, reference numeral 440 denotes a gate pad part contact hole, and the gate pad electrode 426p is electrically connected with the gate pad line 417p via the gate pad part contact hole 440. Reference letter H denotes a gate pad part open hole, and a portion of the gate pad electrode 426p is exposed via the gate pad part open hole H. Herein, in the fourth embodiment of the present invention, the gate pad part contact hole 440 is formed at a region offset from where the gate pad part open hole H will be subsequently be positioned. More specifically, the gate pad part contact hole 440 in the first insulation film 415a is a hole elongated in a direction substantially parallel to the gate pad line 417p and is formed adjacent to a side of the gate pad line 417p. The second insulation film 415b covers a portion of the gate pad electrode 426p in the gate pad part contact hole 440 while the gate pad part open hole H expose another portion of the gate pad electrode 426p. Thus, a region of the gate pad electrode 426p outside of or not overlapped by the second insulation film 415b is exposed.

The TFT includes a gate electrode 421 connected with the gate line 416, a source electrode 422 connected with the data line 417, and a drain electrode 423 connected with the pixel electrode 418. The TFT also includes an active pattern 424 for forming a conductive channel between the source and drain electrodes 422 and 423 by a gate voltage supplied to the gate electrode 421. At a lower portion of the source electrode 422, the drain electrode 423 and the data line 417 made of an opaque conductive material, there are formed a source electrode pattern 422', a drain electrode pattern 423' and a data line pattern (not shown) made of a transparent conductive material and patterned in the same form as the source electrode 422, the drain electrode 423 and the data line 417, respectively. A portion of the source electrode 422 extends in one direction to form a portion of the data line 417, and a portion of the drain electrode pattern 423' extends to the pixel region to form the pixel electrode 418. A portion of the previous gate line 416' overlaps with a portion of the pixel electrode 418 with the first insulation film 415a interposed therebetween to form a storage capacitor Cst.

The array substrates according to the first to fourth exemplary embodiments of the present invention are attached with color filter substrates in a facing manner by a sealant applied to outer edges of the image display part. In this case, the color filter substrates include black matrixes for preventing leakage of light to the TFTs, the gate lines and the data lines and color filters for implementing red, green and blue colors. The attachment of the color filter substrates and the array substrates are made through attachment keys formed on the color filter substrates or the array substrates.

As so far described, in the first to fourth exemplary embodiments of the present invention, because the active patterns are formed of the amorphous silicon thin films and formed in the island type only at the upper portion of the gate electrodes, the off current of the TFTs may be reduced. In addition, because there is no tail (portion or region) of the active pattern made of the amorphous silicon thin film at the lower portion of the data lines, signal interference of the data lines caused by the tail of the active pattern does not occur, and thus, the aperture ratio may increase corresponding to the width of the tail of the active pattern. Also, because there is no tail of the active pattern, a wavy noise is not generated, and thus, the LCD may be fabricated with high picture quality.

In the first to fourth exemplary embodiments of the present invention, as the active patterns, the amorphous silicon TFT using the amorphous silicon thin film is used as an example, but the present invention is not limited thereto and as the active patterns, polycrystalline silicon TFTs using a polycrystalline silicon thin film may be also used. Embodiments of the present invention may be also applied to a different display device fabricated by using TFTs, for example, an OLED (Organic Light Emitting Diode) display device in which OLEDs are connected with driving transistors.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for fabricating a display comprising:
providing a first substrate divided into a pixel part and first and second pad parts;
forming a gate electrode and a gate line in the pixel part of the first substrate and forming a gate pad line in the first pad part of the first substrate;
forming a first insulation film over the gate electrode, the gate line and the gate pad line;
forming an active pattern over the gate electrode with the first insulation film interposed therebetween and forming a contact hole exposing a portion of the gate pad line using a single mask;
forming source and drain electrodes over the active pattern;
forming a pixel electrode formed of a transparent material in the pixel part and forming a pixel electrode pattern formed of an opaque material on the pixel electrode;
forming a gate pad electrode formed of the transparent material electrically connected with the gate pad line via the contact hole;
forming a second insulation film over the pixel electrode, the pixel electrode pattern and the gate pad electrode;
exposing the pixel electrode by etching a portion of the second insulation film and removing the pixel electrode pattern and exposing at least one portion of the gate pad electrode; and
attaching the first substrate and a second substrate.

2. The method for fabricating a display according to claim 1, wherein the single mask is one of a half-tone mask and a diffraction mask.

3. The method for fabricating a display according to claim 1, wherein the forming the active pattern over the gate electrode with the first insulation film interposed therebetween includes patterning the active pattern as an island over the gate electrode within boundaries defined by a perimeter of the gate electrode.

4. The method for fabricating a display according to claim 1, wherein the source and drain electrodes are formed of the opaque material.

5. The method for fabricating a display according to claim 4, wherein forming source and drain electrodes further includes forming source and drain electrode patterns under the source and drain electrodes, respectively.

6. The method for fabricating a display according to claim 1, wherein the forming the gate pad electrode includes forming a gate pad electrode pattern on the gate pad electrode in a same shape as the gate pad electrode.

7. The method for fabricating a display according to claim 6, wherein the gate pad electrode pattern is formed of the opaque material.

8. The method for fabricating a display according to claim 1, wherein the at least one portion of the gate pad electrode is offset from the contact hole such that a region of the first insulation film is interposed between the at least one portion of the gate pad electrode and the gate pad line.

9. The method for fabricating a display according to claim 1, wherein the forming the contact hole includes forming a plurality of contact holes exposing a plurality of portions of the gate pad line using a single mask, and the exposing at least a portion of the gate pad electrode includes exposing a plurality of portions of the gate pad electrode.

10. The method for fabricating a display according to claim 9, wherein the plurality of portions of the gate pad electrode are offset from the plurality of contact holes such that regions of the first insulation film are interposed between the plurality of portions of the gate pad electrode and the gate pad line.

11. The method for fabricating a display according to claim 1, wherein the contact hole is elongated in a direction substantially parallel to the gate pad line.

12. The method for fabricating a display according to claim 11, wherein the contact hole is formed adjacent to a side of the gate pad line.

13. The method for fabricating a display according to claim 11, wherein the second insulation film covers a portion of the gate pad electrode in the contact hole and an other portion of the gate pad electrode is exposed.

* * * * *